US012587253B2

(12) United States Patent
Okuyama et al.

(10) Patent No.: US 12,587,253 B2
(45) Date of Patent: Mar. 24, 2026

(54) BASE STATION AND METHOD FOR A COOPERATIVE SCHEME IN SIGNAL TRANSMISSION

(71) Applicant: NTT DOCOMO, INC., Tokyo (JP)

(72) Inventors: Tatsuki Okuyama, Tokyo (JP); Satoshi Suyama, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 282 days.

(21) Appl. No.: 18/282,924

(22) PCT Filed: Feb. 4, 2022

(86) PCT No.: PCT/JP2022/004424
§ 371 (c)(1),
(2) Date: Sep. 19, 2023

(87) PCT Pub. No.: WO2022/201899
PCT Pub. Date: Sep. 29, 2022

(65) Prior Publication Data
US 2024/0171247 A1 May 23, 2024

(30) Foreign Application Priority Data
Mar. 22, 2021 (JP) ................................ 2021-047409

(51) Int. Cl.
*H04B 7/06* (2006.01)
*H04W 16/28* (2009.01)
(Continued)

(52) U.S. Cl.
CPC .......... *H04B 7/0632* (2013.01); *H04W 16/28* (2013.01); *H01Q 3/22* (2013.01); *H04W 88/085* (2013.01)

(58) Field of Classification Search
CPC ...... H04B 7/0632; H04B 7/022; H04B 7/024; H04B 7/026; H04B 7/06; H04W 16/28;
(Continued)

(56) References Cited

U.S. PATENT DOCUMENTS

2014/0098770 A1* 4/2014 Zhou ........................ H04L 45/16
370/329
2016/0043839 A1* 2/2016 Jitsukawa .............. H04B 7/024
370/329
(Continued)

FOREIGN PATENT DOCUMENTS

EP 3962144 A1 3/2022
JP 2020-182157 A 11/2020
(Continued)

OTHER PUBLICATIONS

Notice of Reasons for Refusal in Japanese Patent Application No. 2021-047409, dated Jan. 28, 2025 (5 pages).
(Continued)

*Primary Examiner* — Afshawn M Towfighi
(74) *Attorney, Agent, or Firm* — Osha Bergman Watanabe & Burton LLP

(57) ABSTRACT

This base station has: a control unit that determines, on the basis of information shown by the movement of a terminal, a linking method for signal transmission by a plurality of wireless stations, and the number of streams of each wireless station; and a transmission unit that links the plurality of wireless stations according to the determined linking method, and transmits a signal to a terminal using the streams.

12 Claims, 6 Drawing Sheets

(51) Int. Cl.
  *H01Q 3/22*          (2006.01)
  *H04W 88/08*        (2009.01)

(58) Field of Classification Search
  CPC ...... H04W 88/085; H04W 28/16; H01Q 3/22;
                                  H01Q 3/46; H01Q 21/28
  See application file for complete search history.

(56)                    References Cited

U.S. PATENT DOCUMENTS

| | | | |
|---|---|---|---|
| 2018/0132227 A1* | 5/2018 | Ghosh | H04W 72/21 |
| 2019/0165983 A1 | 5/2019 | Nakayama | |
| 2019/0223170 A1* | 7/2019 | Deng | H04L 1/16 |
| 2023/0308150 A1* | 9/2023 | Kim | H01Q 25/00 |
| 2024/0171247 A1* | 5/2024 | Okuyama | H04B 7/024 |

FOREIGN PATENT DOCUMENTS

| | | |
|---|---|---|
| WO | 2014/174584 A1 | 10/2014 |
| WO | 2018/008212 A1 | 1/2018 |

OTHER PUBLICATIONS

Office Action issued in Japanese Patent Application No. 2021-047409, mailed on Aug. 27, 2024 (8 pages).
International Search Report issued in PCT/JP2022/004424 on Apr. 26, 2022 (7 pages).
Written Opinion of the International Searching Authority issued in PCT/JP2022/004424 on Apr. 26, 2022 (4 pages).

* cited by examiner

BASE STATION AND METHOD FOR A COOPERATIVE SCHEME IN SIGNAL TRANSMISSION

TECHNICAL FIELD

The present disclosure relates to a base station and a communication method.

BACKGROUND ART

In the 5G (5th generation mobile communication system), large-scale MIMO (Massive Multiple Input Multiple Output) with a multi-element antenna is one of the main techniques. For example, in large-scale MIMO, a sharp beam is generated by beamforming to realize high-speed large-capacity communication (e.g., see Patent Literature (hereinafter, referred to as PTL) 1). Further, in large-scale MIMO, high-speed large-capacity communication is realized by multiplexing a plurality of users or a plurality of streams.

In order to realize further high-speed and large-capacity communication in future radio communication systems, the use of a millimeter wave band in which the bandwidth can be widened has been discussed. For example, since the path loss is greater and the transmission range is shorter than sub-6 in the millimeter wave band, the communication area is narrower, and the communication between the base station and a mobile terminal is possibly unstable. Therefore, a technique for a plurality of radio stations cooperating with one another to perform communication with a terminal has been discussed.

CITATION LIST

Patent Literature

PTL 1
    WO2018/008212

SUMMARY OF INVENTION

Technical Problem

However, the technique for a plurality of radio stations cooperating with one another to perform communication with a terminal in a millimeter wave band has not been sufficiently discussed, and further discussions are required.

An aspect of the present disclosure is to perform stable millimeter wave band communication with a terminal by a plurality of radio stations cooperating with one another.

Solution to Problem

A base station according to an aspect of the present disclosure includes: a control section that determines a cooperative scheme in signal transmission by a plurality of radio stations and a number of streams in each of the plurality of radio stations based on information that appears due to a movement of a terminal; and a transmission section that coordinates the plurality of radio stations in accordance with the cooperative scheme, and transmits a signal to the terminal using the stream or streams.

In a communication method according to an aspect of the present disclosure, a base station determines a cooperative scheme in signal transmission by a plurality of radio stations and a number of streams in each of the plurality of radio stations based on information that appears due to a movement of a terminal, coordinates the plurality of radio stations in accordance with the cooperative scheme, and transmits a signal to the terminal using the stream or streams.

Advantageous Effects of Invention

According to the present disclosure, a base station can coordinate a plurality of radio stations and perform stable millimeter wave band communication with a terminal.

DESCRIPTION OF EMBODIMENTS

Hereinafter, an embodiment according to an aspect of the present disclosure will be described with reference to the drawings.

Figure 1:
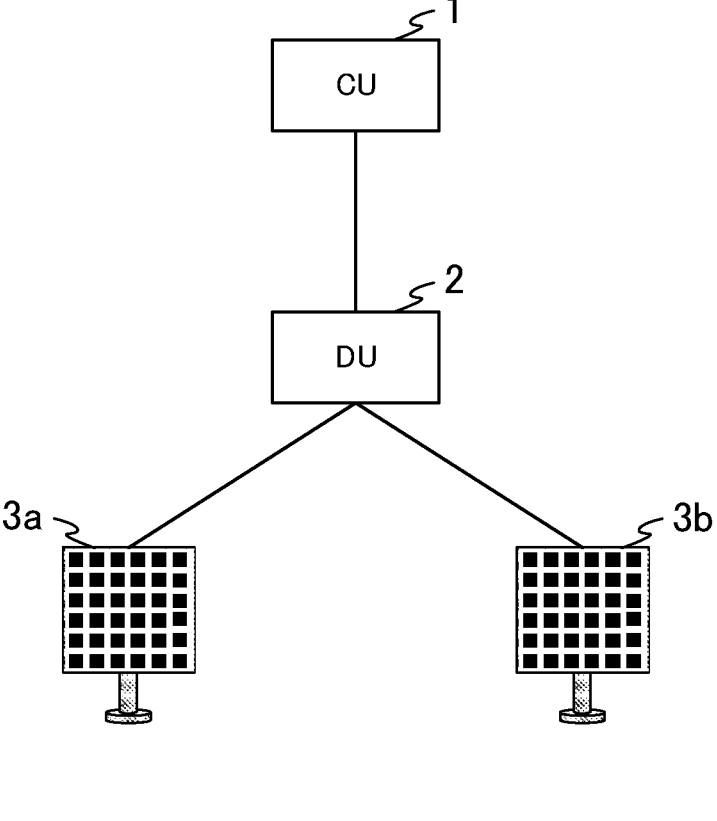
FIG. 1 This figure illustrates an exemplary configuration of a radio communication system according to an embodiment of the present disclosure.

FIG. 1 illustrates an exemplary configuration of a radio communication system according to an embodiment of the present disclosure. As illustrated in FIG. 1, the radio communication system includes CU 1, DU 2, radio stations 3a and 3b, and terminal 4a. Note that CU is an abbreviation for a Centralized Unit. DU is an abbreviation for a Distributed Unit.

CU 1 includes, for example, an RRC layer, an SDAP layer, and a PDCP layer. RRC is an abbreviation for Radio Resource Control. SDAP is an abbreviation for a Service Data Adaptation Protocol. PDCP is an abbreviation for a Packet Data Convergence Protocol.

DU 2 includes, for example, an RLC layer, a MAC layer, and a PHY-High layer. RLC is an abbreviation for Radio Link Control. MAC is an abbreviation for Medium Access Control. PHY is an abbreviation for physical.

Radio stations 3a and 3b include, for example, PHY-Low & RF layers. RF is an abbreviation for a Radio Frequency.

CU 1 is connected to a core network (not illustrated) and DU 2. CU 1 processes a signal received from the core network based on the above-described layer functions, and transmits the processed signal to DU 2. Further, CU 1 processes a signal received from DU 2 based on the above-described layer functions, and transmits the processed signal to the core network.

DU 2 is connected to CU 1 and radio stations 3a and 3b. DU 2 processes a signal received from CU 1 based on the above-described layer functions, and transmits the processed signal to radio stations 3a and 3b. Further, DU 2 processes signals received from radio stations 3a and 3b based on the above-described layer functions, and transmits the processed signal to CU 1.

Radio stations 3a and 3b are connected to DU 2. Further, radio stations 3a and 3b perform radio communication with terminal 4a using a millimeter wave band. Radio stations 3a and 3b process signals received from DU 2 based on the above-described layer function, and transmits the processed signals to terminal 4a. Further, radio stations 3a and 3b process signals received from terminal 4a based on the above-described layer function, and transmits the processed signal to DU 1.

Note that the exemplary configuration of the radio communication system is not limited to the example in FIG. 1. For example, one radio station may be connected to DU 2, or three or more radio stations may be connected to DU 2.

Further, one DU may be connected to each of radio stations 3a and 3b. The DU connected to radio station 3a and the DU connected to radio station 3b may be connected to CU 1.

Furthermore, radio stations 3a and 3b may be cascade-connected. For example, radio station 3a may be connected to DU 2, and radio station 3b may be connected to radio station 3a.

CU 1 and DU 2 may be referred to as a base station or gNB. In addition, CU 1, DU 2, and radio stations 3a and 3b may be referred to as a base station. Further, the radio station may be referred to as a Radio Unit (RU), an extension station, a transmission point, or an antenna panel.

Figure 2A:
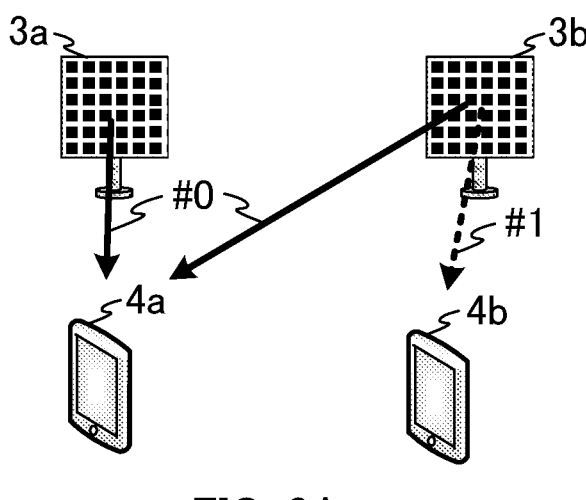
FIG. 2A This figure illustrates an exemplary cooperative scheme of radio stations.
Figure 2B:
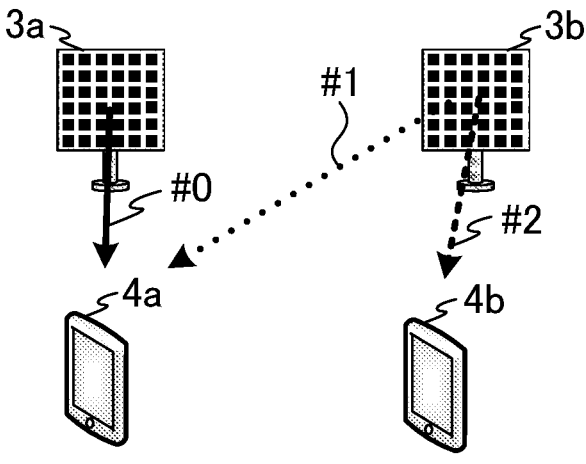
FIG. 2B This figure illustrates another exemplary cooperative scheme of radio stations.
Figure 2C:
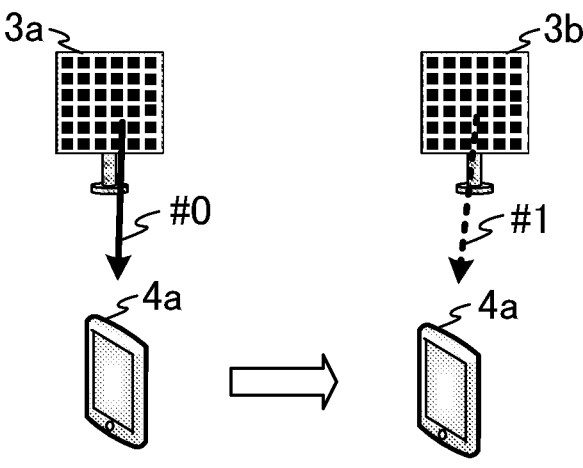
FIG. 2C This figure illustrates still another exemplary cooperative scheme of radio stations.

FIGS. 2A, 2B, and 2C illustrate an exemplary cooperative scheme of radio stations 3a and 3b. In FIGS. 2A, 2B, and 2C, the same components as those in FIG. 1 are denoted by the same reference numerals.

There are, for example, the following three cooperative schemes (cooperative methods) of radio stations 3a and 3b enabling stable high-speed large-capacity communication with terminal 4a that moves at high speed.

A1. Coordinated Transmission Based on a Plurality of Radio Stations 3a and 3b For example, as illustrated in FIG. 2A, radio stations 3a and 3b transmit signals to terminal 4a using stream #0. That is, radio stations 3a and 3b transmit the same signal to terminal 4a. Note that the coordinated transmission may be referred to as simultaneous transmission, coordinated MIMO, or joint transmission.

A2. Distributed MIMO Based on a Plurality of Radio Stations 3a and 3b

For example, as illustrated in FIG. 2B, radio station 3a transmits a signal to terminal 4a using stream #0. Radio station 3b transmits a signal to terminal 4a using stream #1. That is, radio stations 3a and 3b transmit different signals from each other to terminal 4a. Note that the distributed MIMO may be referred to as distributed transmission.

A3. Communication Switching Based on a Plurality of Radio Stations 3a and 3b

For example, as illustrated in FIG. 2C, radio stations 3a and 3b seamlessly switch between streams #0 and #1 in accordance with the movement of terminal 4a, and transmits a signal to terminal 4a. For example, radio station 3a stops transmitting a signal using stream #0 in accordance with the movement of terminal 4a, and radio station 3b starts to transmit a signal using stream #1.

For the above-described cooperation of radio stations 3a and 3b, there is scope for further study on the determination of a stream in each of radio stations 3a and 3b with respect to moving terminal 4a.

The base station of the present disclosure determines a cooperative scheme in signal transmission by radio stations 3a and 3b and the number of streams in each of radio stations 3a and 3b based on the information that appears when terminal 4a moves.

Note that the base station that determines the cooperative scheme and the number of streams may be CU 1 or DU 2. Further, the base station that determines the number of streams may be CU 1 and DU 2. Furthermore, the "information" that appears when terminal 4a moves may be replaced with a signal, a parameter, or an element.

Figure 3:
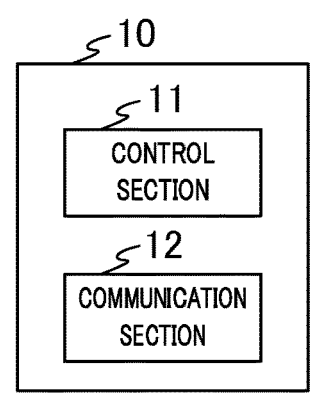
FIG. 3 This figure illustrates an exemplary functional block configuration of a base station.

FIG. 3 illustrates an exemplary functional block configuration of the base station. As illustrated in FIG. 3, base station 10 includes control section 11 and communication section 12.

Control section 11 determines a cooperative scheme in signal transmission by radio stations 3a and 3b and the number of steams in each of radio stations 3a and 3b based on the information that appears due to the movement of terminal 4a. As will be described later, the information that appears due to the movement of terminal 4a may be, for example, a spread of the Doppler spectrum or a change in reception power of a received signal in base station 10 or terminal 4a.

Further, control section 11 controls phase rotation of a signal to be transmitted using the stream based on a phase rotation amount of a received signal in terminal 4a or a channel quality between base station 10 and terminal 4a.

In addition, control section 11 determines the cooperative scheme and the number of streams of a retransmission signal to terminal 4a based on the information that appears due to the movement of terminal 4a.

Communication section 12 performs radio communication with terminal 4a using a millimeter wave band. Communication section 12 coordinates radio stations 3a and 3b in accordance with the cooperative scheme determined by control section 11, and transmits a signal to terminal 4a using the numbers of streams determined by control section 11 for radio stations 3a and 3b, respectively.

<How to Determine Cooperative Scheme and Number of Streams>

Base station 10 determines a cooperative scheme and the numbers of streams of radio stations 3a and 3b based on the following information that appears when terminal 4a moves.

B1. Spread of Doppler Spectrum

As terminal 4a moves, the Doppler spectrum spreads. For example, it can be regarded that, as the Doppler spectrum spreads, the movement speed of terminal 4a is higher and the channel change is more rapid. When the channel change is rapid, separation of the received signal is possibly difficult in terminal 4a.

Therefore, when the Doppler spectrum spreads, decreasing the numbers of streams of the signals to be transmitted by radio stations 3a and 3b can suppress the reduction of the communication speed in some cases. In addition, the cooperation between radio stations 3a and 3b is preferred to be the switching between radio stations 3a and 3b rather than the coordinated transmission and the distributed MIMO.

For example, when the spread of the Doppler spectrum is a threshold value or more, base station 10 determines that terminal 4a moves at high speed and sets the number of streams of the signal to be transmitted to terminal 4a to 1 without executing the coordinated transmission or the distributed MIMO.

Note that base station 10 may transmit a reference signal to terminal 4a, and terminal 4a may measure the spread of the Doppler spectrum of the reference signal. Then, terminal 4a may provide feedback on the measured spread of the Doppler spectrum to base station 10. For the reference signal, DMRS (DeModulation Reference Signals) may be used, for example.

Further, terminal 4a may transmit a reference signal to base station 10, and base station 10 may measure the spread of the Doppler spectrum of the reference signal.

Furthermore, base station 10 may change the number of streams in accordance with the spread of the Doppler spectrum of the signal. For example, base station 10 may decrease the number of streams as the Doppler spectrum spreads. When the determined number of streams is a threshold value or more, base station 10 may perform either one or both of the coordinated transmission and/or the distributed MIMO.

B2. Change in Reception Power

B2-1. When terminal 4a moves, the reception power changes. For example, it can be regarded that terminal 4a moves away from radio station 3a when reception power of a signal (e.g., a reference signal) received by radio station 3a from terminal 4a decreases. In other words, terminal 4a can be regarded as moving toward the cell edge of radio station 3a. The reception power may be, for example, Reference Signal Received Power (RSRP).

Then, when base station 10 determines that terminal 4a moves toward the cell edge of radio station 3a based on the change in the reception power of the signal received by radio station 3a from terminal 4a, base station 10 decreases the number of streams and concentrates the power of the signal to be transmitted to terminal 4a.

In addition, base station 10 applies the coordinated transmission based on radio station 3a and radio station 3b in order to enhance the reception power of terminal 4a at the cell edge.

Further, when the moving speed of terminal 4a is high, base station 10 predictively (early) performs switching processing between radio station 3a and neighboring radio station 3b. That is, base station 10 controls the timing of communication switching between radio station 3a and neighboring radio station 3b in accordance with the moving speed of terminal 4a.

B2-2. When the reception power of the signals of terminal 4a received by radio station 3a and radio station 3b is the same, the communication quality between radio station 3a and terminal 4a and the communication quality between radio station 3b and terminal 4a can be regarded as the same.

For example, when the difference between the reception power of the signal of terminal 4a received by radio station 3a and the reception power of the signal of terminal 4a received by radio station 3b is a threshold value or less, the communication quality between radio station 3a and terminal 4a and the communication quality between radio station 3b and terminal 4a can be regarded as the same.

Then, when the communication quality between radio station 3a and terminal 4a and the communication quality between radio station 3b and terminal 4a are the same, base station 10 transmits a signal to terminal 4a using a plurality of streams that is based on the distributed MIMO, expecting that Line Of Sight (LOS) between radio station 3a and terminal 4a and LOS between radio station 3a and terminal 4a are obtained.

That is, when base station 10 determines that the communication quality between radio station 3a and terminal 4a and the communication quality between radio station 3b and terminal 4a are the same (e.g., the difference in the communication quality is a threshold value or less), base station 10 transmits a signal to terminal 4a using a plurality of streams that is based on the distributed MIMO.

Note that base station 10 may transmit a reference signal to terminal 4a, and terminal 4a may measure the reception power of the reference signal. Then, terminal 4a may provide feedback on the measured reception power to base station 10.

Further, base station 10 may independently execute the controls that are based on the "spread of the Doppler spectrum" and the "change in the reception power" described above, or may execute the controls in combination. Furthermore, base station 10 may perform the same control not only in a single user environment but also in a multi user environment.

<Enhancement of Communication Quality Based on Base Station Function and Terminal Function>

In addition to determining the cooperative scheme and the numbers of streams in radio stations 3a and 3b, base station 10 may enhance the communication quality of terminal 4a that moves at high speed, using the following functions of base station 10 and terminal 4a.

C1. AFC Function of Base Station 10

When base station 10 has an AFC function, base station 10 removes the phase rotation of the signal due to the Doppler shift in an LOS component on the base station 10 side. For example, base station 10 performs phase rotation on the signal on the base station 10 side in advance so that the phase rotation of the signal received by terminal 4a becomes 0 in terminal 4a. AFC is an abbreviation for Automatic Frequency Control.

C2. Channel Tracking Function of Base Station 10

When base station 10 has a channel tracking function, base station 10 removes the phase rotation of a Non Line Of Sight (NLOS) component of the signal on the base station side. For example, base station 10 performs phase rotation on the signal on the base station 10 side in advance so that the phase rotation of the signal to be received by terminal 4a becomes 0 in terminal 4a. Note that the channel tracking function represents, for example, a function of (instantaneously) monitoring a channel to calculate a precoding matrix, and performing a precoding matrix on a transmission signal.

C3. AFC Function of Terminal

When terminal 4a has an AFC function, terminal 4a removes the phase rotation of the signal due to the Doppler shift in an LOS component on the terminal 4a side. When the frequency of removing phase rotation is high, terminal 4a can reduce the number of Orthogonal Frequency Division Multiplexing (OFDM) symbols affected by the phase rotation.

Note that, when base station 10 has both the AFC function and the channel tracking function, base station 10 can perform high-quality communication with terminal 4a even though terminal 4a has no AFC function. The communication quality between base station and terminal 4a is less affected by (dependent on) whether terminal 4a has an AFC function.

Further, when base station 10 has either the AFC function or the channel tracking function, the communication quality with terminal 4a is degraded compared to the case where base station 10 has both the AFC function and the channel tracking function. The communication quality between base station 10 and terminal 4a depends on whether terminal 4a has an AFC function, compared to the case where base station 10 has both the AFC function and the channel tracking function.

Further, when base station 10 has neither the AFC function nor the channel tracking function, the communication quality between base station 10 and terminal 4a depends on whether terminal 4a has an AFC function.

<Retransmission Signal>

Base station 10 may control the cooperative scheme and the numbers of streams of radio stations 3a and 3b for a retransmission signal.

D1. Retransmission Control in Coordinated Transmission

Base station 10 determines the cooperative scheme and the numbers of streams of radio stations 3a and 3b for a retransmission signal based on the information that appears when terminal 4a moves. For example, when signal retransmission is to occur, base station determines a stream for transmitting a retransmission signal to be a stream that differs from the stream in which the signal has been transmitted, based on the information that appears when terminal 4a moves.

Figure 4:
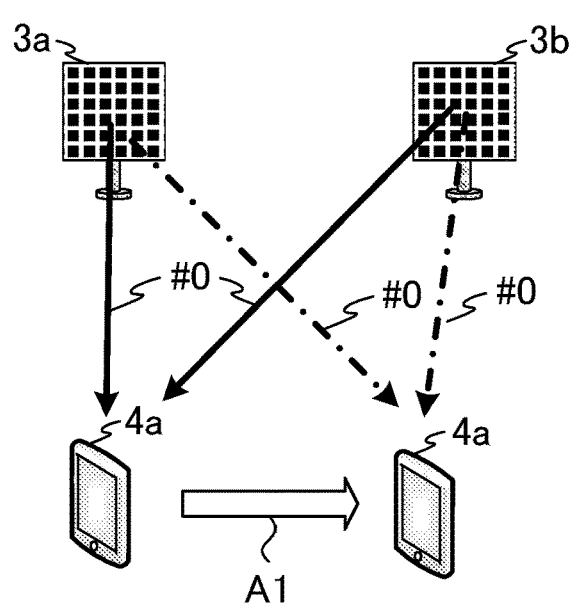
FIG. 4 This figure illustrates an exemplary stream control of a retransmission signal.

FIG. 4 illustrates an exemplary stream control of a retransmission signal. In FIG. 4, the same components as those in FIG. 1 are denoted by the same reference numerals.

As illustrated in FIG. 4, base station 10 transmits a signal to terminal 4a in stream #0 by coordinated transmission using radio stations 3a and 3b.

It is herein assumed that terminal 4a moves away from radio station 3a and approaches radio station 3b as indicated by arrow A1 in FIG. 4. It is assumed that base station 10 determines retransmission of the signal to be transmitted to terminal 4a.

When base station 10 determines the retransmission of the signal, base station 10 determines the moving direction of terminal 4a according to a change in reception power of the signal. For example, when the reception power of the signal of terminal 4a in radio station 3a decreases and the reception power of the signal of terminal 4a in radio station 3b increases, base station 10 determines that terminal 3a is away from radio station 4a and approaches radio station 3b.

When determining the moving direction of terminal 4a, base station 10 determines the stream of the retransmission signal based on the determined moving direction. For example, base station 10 determines the stream so as to transmit the retransmission signal from radio station 3b determined as the destination of terminal 4a. For example, as illustrated in FIG. 4, base station 10 transmits a signal to terminal 4a using stream #0 of radio station 3a, and transmits a retransmission signal to terminal 4a using stream #0 of radio station 3b.

D2. Retransmission Control in Distributed MIMO

In the case of executing the distributed MIMO, base station 10 transmits a retransmission signal in the second radio station, for example, when a signal to be transmitted in the first radio station (the first stream) is incorrect and a signal to be transmitted in the second radio station (the second stream) is not incorrect.

Figure 5:
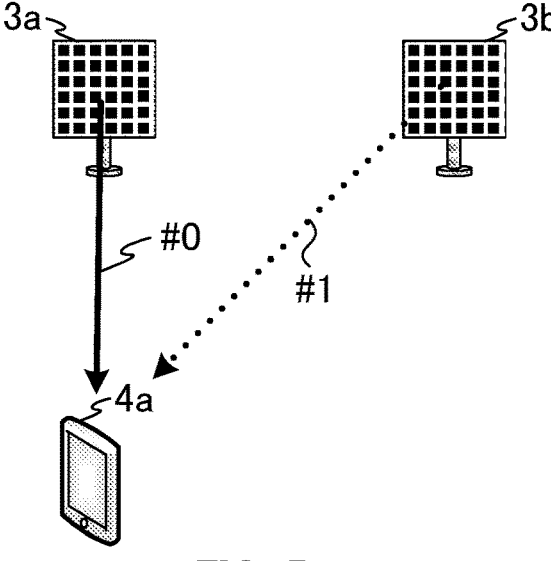
FIG. 5 This figure illustrates another exemplary stream control of the retransmission signal.

FIG. 5 illustrates an exemplary stream control of a retransmission signal. In FIG. 5, the same components as those in FIG. 1 are denoted by the same reference numerals.

As illustrated in FIG. 5, base station 10 transmits a signal to terminal 4a in streams #0 and #1 by distributed MIMO using radio stations 3a and 3b.

It is herein assumed that an error occurs on the signal in stream #0. In this case, base station 10 transmits a retransmission signal to terminal 4a using stream #1 of radio station 3b, not stream #0 of radio station 3a.

D3. Another Retransmission Control

When the number of retransmissions of retransmission signals in the first radio station or the first stream is a threshold value or more, base station 10 transmits a retransmission signal from the second radio station or the second stream.

Base station 10 may combine the control of the cooperative scheme and the number of streams described in above B1 and B2, the control based on the functions of base station and terminal 4a described in C1, C2, and C3, and the retransmission control described in D1 and D2.

Hereinafter, the control according to the cooperative scheme and the number of streams described in B1 may be referred to as "control 1", the stream control described in B2 may be referred to as "control 2", the control based on the functions described in C1, C2, and C3 may be referred to as "control 3", and the retransmission control described in D1 and D2 may be referred to as "control 4".

Figure 6A:
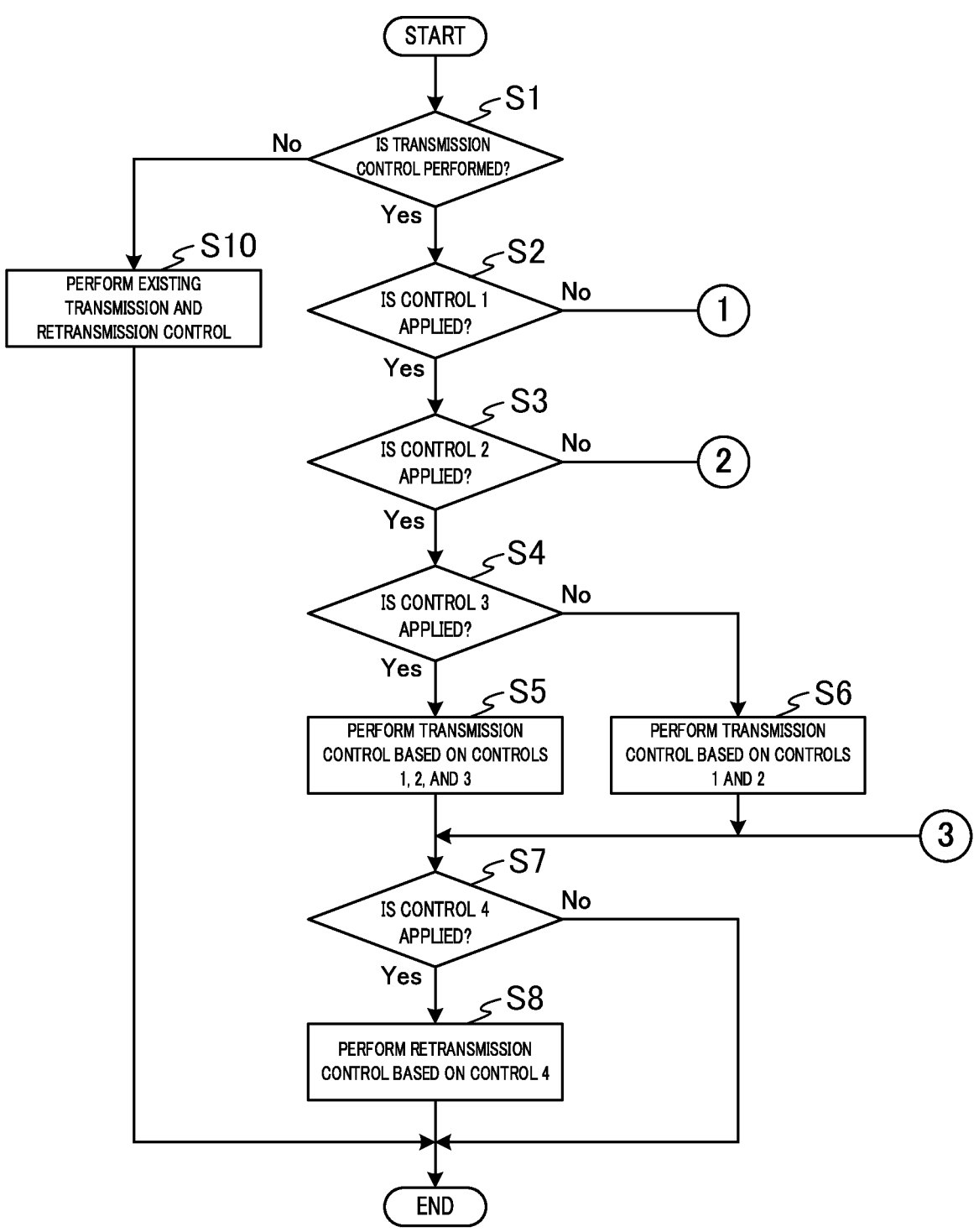
FIG. 6A This figure is a flowchart illustrating an exemplary operation of the base station.
Figure 6B:
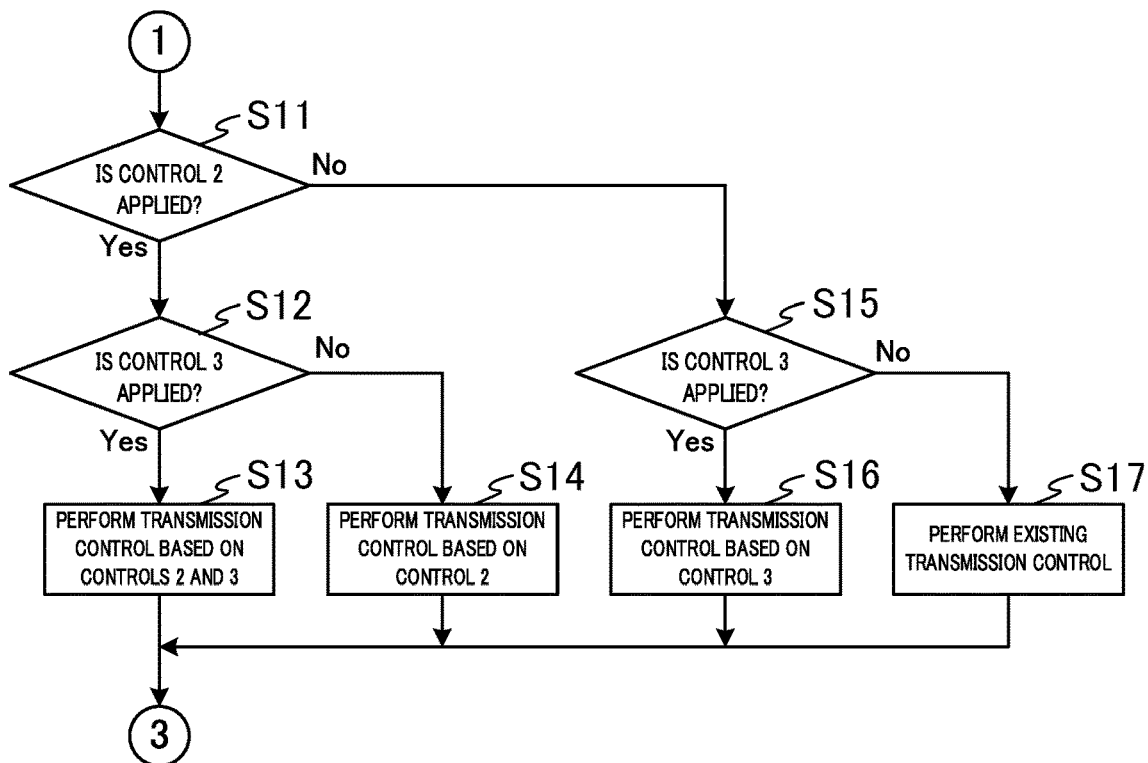
FIG. 6B This figure is another flowchart illustrating the exemplary operation of the base station.
Figure 6C:
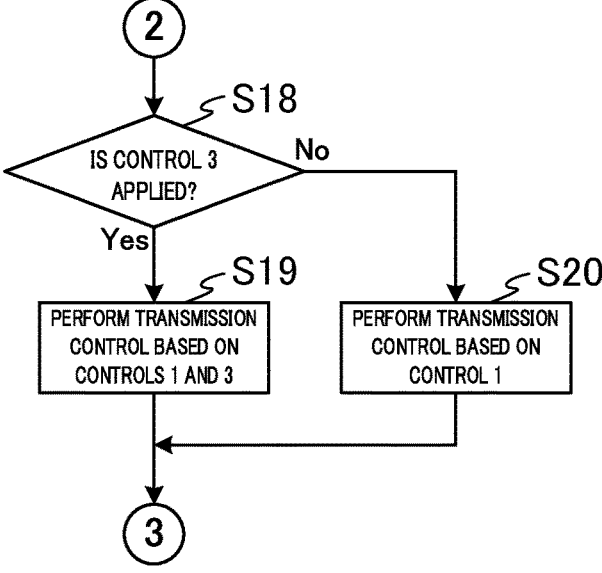
FIG. 6C This figure is still another flowchart illustrating the exemplary operation of the base station.

FIGS. 6A, 6B, and 6C are flowcharts illustrating an exemplary operation of base station 10. For example, base station 10 repeatedly executes the processing illustrated in FIGS. 6A, 6B, and 6C. Note that, the processes in the flowcharts illustrated in FIGS. 6A, 6B, and 6C are connected with one another at numbers 1 to 3 illustrated in the drawings.

Base station 10 determines whether to perform transmission control based on the quality prediction (S1). For example, base station 10 determines whether to autonomously perform the transmission control based on the quality prediction by Artificial Intelligence (AI). Alternatively, base station 10 determines to execute the transmission control when the transmission control based on the quality prediction is configured by the operator. Note that the transmission control based on the quality prediction represents at least one of above-described controls 1 to 4.

When base station 10 determines not to execute the transmission control in S1 (No in S1), base station 10 transmits a signal and a retransmission signal based on the existing transmission control and the existing retransmission control (S10). Then, base station 10 ends the processing of the flowchart.

On the other hand, when base station 10 determines to execute the transmission control based on the quality prediction in S1 (Yes in S1), base station 10 determines whether to apply control 1 to the transmission control of the signal (S2). For example, when the spread of the Doppler spectrum is a threshold value or more, base station 10 determines to apply control 1.

When base station 10 determines to apply control 1 in S2 (Yes in S2), base station determines whether to apply control 2 to the transmission control of the signal (S3). For example, base station 10 determines to apply control 2 based on a change in reception power. Specifically, when the change in the reception power is a preset threshold value or more, base station 10 determines to apply control 2.

When base station 10 determines to apply control 2 in S3 (Yes in S3), base station determines whether to apply control 3 to the transmission control of the signal (S4). For example, when base station 10 has either one or both of the AFC function and/or the channel tracking function, base station 10 determines to apply control 3.

When base station 10 determines to apply control 3 in S4 (Yes in S4), base station executes the transmission control based on controls 1, 2, and 3 (S5). On the other hand, when base station 10 determines not to apply control 3 in S4 (No in S4), base station 10 executes the transmission control based on controls 1 and 2 (S6).

Base station 10 determines whether to apply control 4 (S7). For example, when signal retransmission is to occur, base station 10 determines to apply control 4.

When base station 10 determines to apply control 4 in S7 (Yes in S7), base station executes the retransmission control based on control 4 (S8). On the other hand, when base station 10 determines not to apply control 4 in S7 (No in S7), base station 10 ends the processing of the flowchart.

When base station 10 determines not to apply control 1 in S2 (No in S2), base station 10 determines whether to apply control 2 to the transmission control of the signal as illustrated in FIG. 6B (S11). For example, when there is a change in reception power, base station 10 determines to apply control 2.

When determining to apply control 2 in S11 (Yes in S11), base station 10 determines whether to apply control 3 to the transmission control of the signal (S12). For example, when base station 10 has either one or both of the AFC function and/or the channel tracking function, base station 10 determines to apply control 3.

When determining to apply control 3 in S12 (Yes in S12), base station 10 executes the transmission control based on controls 2 and 3 (S13). On the other hand, when determining not to apply control 3 in S12 (No in S12), base station 10 executes the transmission control based on control 2 (S14).

When determining not to apply control 2 in S11 (No in S11), base station 10 determines whether to apply control 3 to the transmission control of the signal (S15). For example, when base station 10 has either one or both of the AFC function and/or the channel tracking function, base station 10 determines to apply control 3.

When determining to apply control 3 in S15 (Yes in S15), base station 10 executes the transmission control based on control 3 (S16). On the other hand, when determining not to apply control 3 in S15 (No in S16), base station 10 executes the existing transmission control (S17).

When determining not to apply control 2 in S3 in FIG. 6A (No in S3), base station determines whether to apply control 3 to the transmission control of the signal as illustrated in FIG. 6C (S18). For example, when base station 10 has either one or both of the AFC function and/or the channel tracking function, base station 10 determines to apply control 3.

When determining to apply control 3 in S18 (Yes in S18), base station 10 executes the transmission control based on controls 1 and 3 (S19). On the other hand, when determining not to apply control 3 in S18 (No in S18), base station 10 executes the transmission control based on control 1 (S20).

As described above, base station 10 includes control section 11 that determines the cooperative scheme in signal transmission by radio stations 3a and 3b and the number of streams in each of radio stations 3a and 3b based on the information that appears due to the movement of terminal 4a, and communication section 12 that transmits a signal to terminal 4a using the determined stream.

As a result, base station 10 can coordinate a plurality of radio stations 3a and 3b and perform stable millimeter wave band communication with terminal 4a.

For example, the information that appears due to the movement of terminal 4a includes a spread of the Doppler spectrum or a change in the reception power. Base station determines the cooperative scheme in signal transmission by radio stations 3a and 3b and the number of streams in each of radio stations 3a and 3b, based on the spread of the Doppler spectrum or the reception power in accordance with the movement of terminal 4a. Accordingly, base station 10 can appropriately transmit a signal in accordance with the movement of terminal 4a, and can perform stable high-speed large-capacity communication with terminal 4a that moves at high speed in radio communication using a millimeter wave band.

The present disclosure has been described above.

<Hardware Configuration and the Like>

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (e.g., via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmission section," "transmitting unit," or "transmitter." The methods for implementing the functions are not limited specifically as described above.

Figure 7:
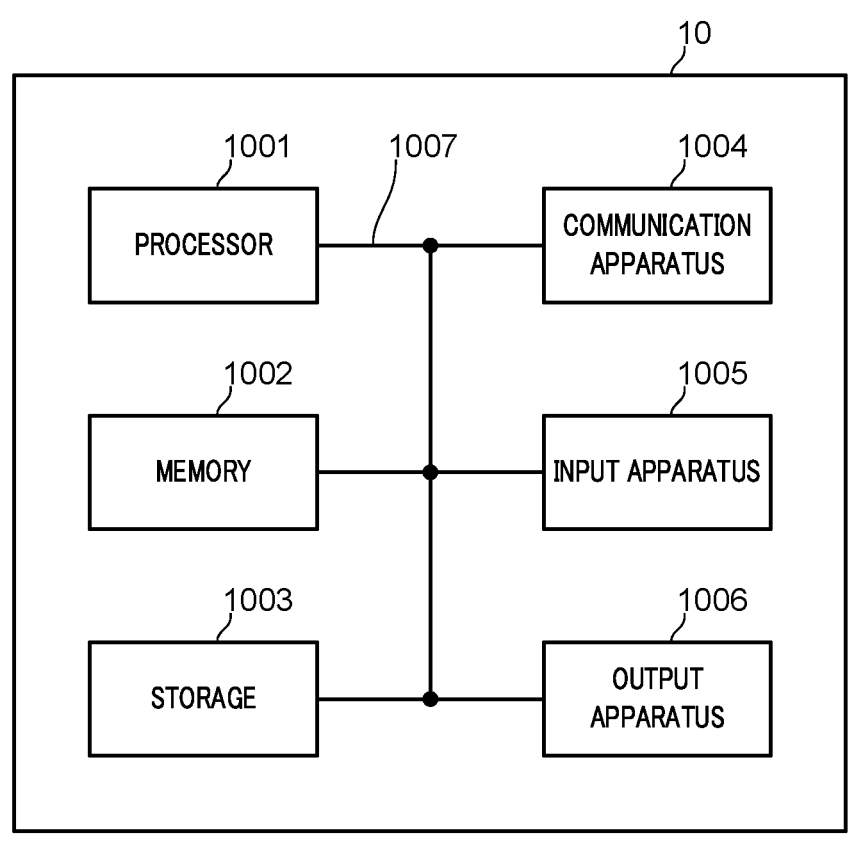
FIG. 7 This figure illustrates an exemplary hardware configuration of the base station.

For example, base station 10 according to an embodiment of the present disclosure may function as a computer that executes processing of a wireless communication method of the present disclosure. FIG. 7 illustrates an exemplary hardware configuration of base station 10. Physically, base station 10 as described above may be a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of base station 10 may include one apparatus or a plurality of apparatuses illustrated in the drawings or may not include part of the apparatuses.

The functions of base station 10 are implemented by predetermined software (program) loaded into hardware, such as processor 1001, memory 1002, and the like, according to which processor 1001 performs the arithmetic and controls communication performed by communication apparatus 1004 or at least one of reading and writing of data in memory 1002 and storage 1003. The functions of modules A, B, and C may be achieved by processor 1001.

Processor 1001 operates an operating system to entirely control the computer, for example. Processor 1001 may be composed of a central processing unit (CPU) including an interface with peripheral apparatuses, control apparatus, arithmetic apparatus, register, and the like.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiment is used. For example, the function of control section 11 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that, the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the wireless communication method according to an embodiment of the present disclosure.

Storage 1003 is a computer-readable recording medium and may be composed of, for example, at least one of an optical disk such as a CD-ROM (Compact Disc ROM), a hard disk drive, a flexible disk, a magneto-optical disk (e.g., a compact disc, a digital versatile disc, or a Blue-ray (registered trademark) disc), a smart card, a flash memory (e.g., a card, a stick, or a key drive), a floppy (registered trademark) disk, and a magnetic strip. Storage 1003 may also be called an auxiliary storage apparatus. The storage medium as described above may be, for example, a database, a server or other appropriate media including at least one of memory 1002 and storage 1003.

Communication apparatus 1004 is hardware (transmission and reception device) for communication between computers through at least one of wired and wireless networks and is also called, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. Communication section 12 may be realized by communication apparatus 1004. Communication section 12 may include a receiver for receiving a signal and a transmitter for transmitting a signal.

Input apparatus 1005 is an input device (e.g., a keyboard, a mouse, a microphone, a switch, a button, or a sensor) that receives input from the outside. Output apparatus 1006 is an output device (e.g., a display, a speaker, or an LED lamp) which makes outputs to the outside. Note that, input apparatus 1005 and output apparatus 1006 may be integrated (e.g., a touch panel).

The apparatuses, such as processor 1001, memory 1002 and the like, are connected by bus 1007 for communication of information. Bus 1007 may be configured using one bus or using buses different between each pair of the apparatuses.

Furthermore, base station 10 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented using at least one of these pieces of hardware.

<Notification and Signaling of Information>

The notification of information is not limited to the embodiment described in the present disclosure, and the information may be notified by another method. For example, the notification of information may be carried out by one or a combination of physical layer signaling (e.g., DCI (Downlink Control Information) and UCI (Uplink Control Information)), higher layer signaling (e.g., RRC (Radio Resource Control) signaling, MAC (Medium Access Control) signaling, notification information (MIB (Master Information Block) and SIB (System Information Block))), and other signals. The RRC signaling may be called an RRC message and may be, for example, an RRC connection setup message, an RRC connection reconfiguration message, or the like.

<Application System>

The embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UMB (Ultra-WideBand), Bluetooth (registered trademark), or other appropriate systems and a next-generation system extended based on the above systems. Additionally or alternatively, a combination of two or more of the systems (e.g., a combination of at least one of LTE and LTE-A and 5G) may be applied.

<Processing Procedure and the Like>

The orders of the processing procedures, the sequences, the flow charts, and the like of the aspects and embodiment described in the present disclosure may be changed as long as there is no contradiction. For example, elements of various steps are presented in exemplary orders in the methods described in the present disclosure, and the methods are not limited to the presented specific orders.

<Operation of Base Station>

Specific operations which are described in the present disclosure as being performed by the base station may sometimes be performed by a higher node (upper node) depending on the situation. Various operations performed for communication with a terminal in a network constituted by one network node or a plurality of network nodes including a base station can be obviously performed by at least one of the base station and a network node other than the base station (examples include, but not limited to, MME and S-GW). Although there is one network node in addition to the base station in the case illustrated above, a plurality of other network nodes may be combined (e.g., MME and S-GW).

<Direction of Input and Output>

The information or the like (see the item of "Information and Signals") can be output from a higher layer (or a lower layer) to a lower layer (or a higher layer). The information or the like may be input and output through a plurality of network nodes.

<Handling of Input and Output Information and the Like>

The input and output information and the like may be saved in a specific place (e.g., memory) or may be managed using a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (e.g., comparison with a predetermined value).

<Variations and the Like of Aspects>

The aspects and embodiment described in the present disclosure may be independently used, may be used in combination, or may be switched and used along the execution. Further, notification of predetermined information (e.g., notification indicating "it is X") is not limited to explicit notification, and may be performed implicitly (e.g., by not notifying the predetermined information).

While the present disclosure has been described in detail, it is obvious to those skilled in the art that the present disclosure is not limited to the embodiment described in the present disclosure. Modifications and variations of the aspects of the present disclosure can be made without departing from the spirit and the scope of the present disclosure defined by the description of the appended claims. Therefore, the description in the present disclosure is intended for exemplary description and does not limit the present disclosure in any sense.

<Software>

Regardless of whether the software is called software, firmware, middleware, a microcode, or a hardware description language or by another name, the software should be broadly interpreted to mean instruction, an instruction set, a code, a code segment, a program code, a program, a sub-program, a software module, an application, a software application, a software package, a routine, a subroutine, an object, an executable file, an execution thread, a procedure, a function, and the like.

The software, the instruction, the information and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

<Information and Signals>

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that, the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

<System and Network>

The terms "system" and "network" used in the present disclosure can be interchangeably used.

<Names of Parameters and Channels>

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (e.g., PUCCH and PDCCH) and information elements can be identified by any suitable names, and various names allocated to these various channels and information elements are not limitative in any respect.

<Base Station>

The terms "base station (BS)", "wireless base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be used interchangeably in the present disclosure. The base station may be called a macro cell, a small cell, a femtocell, or a pico cell.

The base station can accommodate one cell or a plurality of (e.g., three) cells. When the base station accommodates a plurality of cells, the entire coverage area of the base station can be divided into a plurality of smaller areas, and each of the smaller areas can provide a communication service based on a base station subsystem (e.g., small base station for indoor (RRH: Remote Radio Head)). The term "cell" or "sector" denotes part or all of the coverage area of at least one of the base station and the base station subsystem that perform the communication service in the coverage.

<Mobile Station>

The terms "Mobile Station (MS)", "user terminal", "User Equipment (UE)", and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

<Base Station/Mobile Station>

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be IoT (Internet of Things) equipment such as a sensor.

The base station in the present disclosure may also be replaced with the user terminal. For example, the embodiment of the present disclosure may find application in a configuration that results from replacing communication between the base station and the user terminal with communication between multiple user terminals (such communication may, e.g., be referred to as D2D (Device-to-Device), V2X (Vehicle-to-Everything), or the like). In this case, the user terminal may be configured to have the functions that the base station described above has. The wordings "uplink" and "downlink" may be replaced with a corresponding wording for inter-terminal communication (e.g., "side"). For example, an uplink channel, a downlink channel, and the like may be replaced with a side channel.

Similarly, the user terminal in the present disclosure may be replaced with the base station. In this case, the base station is configured to have the functions that the user terminal described above has.

<Meaning and Interpretation of Terms>

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming", "expecting", "considering", and the like.

The terms "connected" and "coupled" as well as any modifications of the terms mean direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed". When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

<Reference Signal>

The reference signal can also be abbreviated to an RS and may also be called a pilot depending on the applied standard.

<Meaning of "Based On">

The description "based on" used in the present disclosure does not mean "based only on", unless otherwise specified. In other words, the description "based on" means both of "based only on" and "based at least on".

<"First" and "Second">

Any reference to elements by using the terms "first", "second" and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

<Means>

The "means" in the configuration of each apparatus described above may be replaced with "section", "circuit", "device", or the like.

<Open Form>

In a case where terms "include", "including", and their modifications are used in the present disclosure, these terms are intended to be inclusive like the term "comprising".

Further, the term "or" used in the present disclosure is not intended to be an exclusive or.

<Time Units Such as TTI, Frequency Units Such as RB, and Radio Frame Configuration>

The radio frame may be constituted by one frame or a plurality of frames in the time domain. The one frame or each of the plurality of frames may be called a subframe in the time domain.

The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology indicates, for example, at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., OFDM (Orthogonal Frequency Division Multiplexing) symbol, SC-FDMA (Single Carrier-Frequency Division Multiple Access) symbol, or the like) in the time domain. The slot may also be a time unit based on the numerology.

The slot may include a plurality of mini-slots. Each of the mini slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini-slot, and the symbol indicate time units in transmitting signals. The radio frame, the subframe, the slot, the mini-slot, and the symbol may be called by other corresponding names.

For example, one subframe, a plurality of continuous subframes, one slot, or one mini-slot may be called a Transmission Time Interval (TTI). That is, at least one of a subframe and the TTI may be a subframe (1 ms) in the existing LTE, a duration (e.g., 1 to 13 symbols) that is shorter than 1 ms, or a duration that is longer than 1 ms. Note that, a unit that represents the TTI may be referred to as a slot, a mini-slot or the like instead of a subframe.

Here, the TTI, for example, refers to a minimum time unit for scheduling in wireless communication. For example, in an LTE system, the base station performs scheduling for allocating a radio resource (a frequency bandwidth, a transmit power, and the like that can be used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (e.g., the number of symbols) to which the transport block, the code block, the codeword or the like is actually mapped may be shorter than the TTI.

Note that, in a case where one slot or one mini-slot is referred to as the TTI, one or more TTIs (that is, one or more slots or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that, the long TTI (e.g., the usual TTI, the subframe, or the like) may be replaced with the TTI that has a time length which exceeds 1 ms, and the short TTI (e.g., the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini-slot, one subframe, or one TTI. One TTI and one subframe may be constituted by one resource block or a plurality of resource blocks.

Note that, one or more RBs may be referred to as a Physical Resource Block (PRB: Physical RB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common RBs (common resource blocks) for certain numerology in a certain carrier. Here, the common RBs may be identified by RB indices that use a common reference point of the carrier as a reference. The PRB may be defined by a certain BWP and may be numbered within the BWP.

The BWP may include a BWP for UL (UL BWP) and a BWP for DL (DL BWP). An UE may be configured with one or more BWPs within one carrier.

At least one of the configured BWPs may be active, and the UE does not have to assume transmission/reception of a predetermined signal or channel outside the active BWP. Note that, "cell", "carrier" and the like in the present disclosure may be replaced with "BWP".

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

<Maximum Transmit Power>

The "maximum transmit power" described in the present disclosure may mean a maximum value of the transmit power, the nominal UE maximum transmit power, or the rated UE maximum transmit power.

<Article>

In a case where articles, such as "a", "an", and "the" in English, for example, are added in the present disclosure by translation, nouns following these articles may have the same meaning as used in the plural.

<"Different">

In the present disclosure, the expression "A and B are different" may mean that "A and B are different from each other". Note that, the expression may also mean that "A and B are different from C". The expressions "separated" and "coupled" may also be interpreted in the same manner as the expression "A and B are different"

This application is based on Japanese Patent Application No. 2021-047409 filed on Mach 22, 2021, the disclosure of which including the specification, drawings and abstract is incorporated herein by reference in its entirety.

INDUSTRIAL APPLICABILITY

The present disclosure is useful for a radio communication system.

REFERENCE SIGNS LIST

1 CU
2 DU
3a, 3b Radio station
4a, 4b Terminal
10 Base station
11 Control section
12 Communication Section

The invention claimed is:

1. A base station, comprising:
a control section that determines a cooperative scheme in signal transmission by a plurality of radio stations and a number of streams in each of the plurality of radio stations based on information that appears due to a movement of a terminal; and
a transmission section that coordinates the plurality of radio stations in accordance with the cooperative scheme, and transmits a signal to the terminal using the stream or streams,
wherein determining the cooperative scheme comprises selecting the cooperative scheme among a coordinated transmission, a distributed transmission and a communication switching between the plurality of radio stations, and
wherein one of the cooperative scheme or the number of streams is determined based on a relative moving speed of the terminal inferred from the information.

2. The base station according to claim 1, wherein the information that appears due to the movement of the terminal is a spread of a Doppler spectrum.

3. The base station according to claim 1, wherein the information that appears due to the movement of the terminal is a change in reception power.

4. The base station according to claim 1, wherein the control section determines the cooperative scheme and the number of streams of a retransmission signal based on the information that appears due to the movement of the terminal.

5. The base station according to claim 1, wherein the control section controls phase rotation of the signal to be transmitted using the stream or streams, based on a phase rotation amount of a received signal in the terminal or a channel quality between the base station and the terminal.

6. A communication method, comprising:

determining, by a base station, a cooperative scheme in signal transmission by a plurality of radio stations and a number of streams in each of the plurality of radio stations based on information that appears due to a movement of a terminal; and coordinating, by the base station, the plurality of radio stations in accordance with the cooperative scheme, and transmitting a signal to the terminal using the stream or streams, wherein determining the cooperative scheme comprises selecting the cooperative scheme among a coordinated transmission, a distributed transmission and a communication switching between the plurality of radio stations, and wherein one of the cooperative scheme or the number of streams is determined based on a relative moving speed of the terminal inferred from the information.

7. The base station according to claim 2, wherein the information that appears due to the movement of the terminal is a change in reception power.

8. The base station according to claim 2, wherein the control section determines the cooperative scheme and the number of streams of a retransmission signal based on the information that appears due to the movement of the terminal.

9. The base station according to claim 3, wherein the control section determines the cooperative scheme and the number of streams of a retransmission signal based on the information that appears due to the movement of the terminal.

10. The base station according to claim 2, wherein the control section controls phase rotation of the signal to be transmitted using the stream or streams, based on a phase rotation amount of a received signal in the terminal or a channel quality between the base station and the terminal.

11. The base station according to claim 3, wherein the control section controls phase rotation of the signal to be transmitted using the stream or streams, based on a phase rotation amount of a received signal in the terminal or a channel quality between the base station and the terminal.

12. The base station according to claim 4, wherein the control section controls phase rotation of the signal to be transmitted using the stream or streams, based on a phase rotation amount of a received signal in the terminal or a channel quality between the base station and the terminal.

* * * * *